United States Patent

Loft et al.

[15] 3,638,422
[45] Feb. 1, 1972

[54] TWO-SHAFT GAS TURBINE CONTROL SYSTEM

[72] Inventors: Arne Loft, Scotia; Daniel Johnson, Schenectady, both of N.Y.

[73] Assignee: General Electric Company

[22] Filed: June 26, 1970

[21] Appl. No.: 50,286

[52] U.S. Cl. ............................................. 60/39.28, 416/30
[51] Int. Cl. ........................................ F02c 9/08, B63h 3/10
[58] Field of Search ............................. 60/39.28; 416/27, 30

[56] References Cited

UNITED STATES PATENTS

| | | | |
|---|---|---|---|
| 2,625,789 | 1/1953 | Starkey | 60/39.28 X |
| 3,168,810 | 2/1965 | Gatzemeyer | 60/39.25 X |
| 3,199,293 | 8/1965 | Starkey | 60/39.25 |
| 3,243,596 | 3/1966 | Loft | 60/39.25 X |
| 3,482,396 | 12/1969 | Nelson | 60/39.28 |
| 3,520,133 | 7/1970 | Loft | 60/39.28 X |

*Primary Examiner*—Clarence B. Gordon
*Attorney*—William C. Crutcher, Bryan C. Ogden, Frank L. Neuhauser, Oscar B. Waddell and Joseph B. Forman

[57] ABSTRACT

In a two-shaft gas turbine having an adjustable nozzle between the compressor high-pressure turbine and the load turbine, a control system is provided in which a biasing signal is added to the fuel temperature control increasing its base reference so that on an increase in called for speed or load the gas turbine is able to dynamically respond in an improved manner. The steady-state temperature limits are exceeded transiently without damage to the gas turbine until the system returns to its new steady-state condition.

Also provided for the two-shaft gas turbine is an acceleration limiting control whereby the overall gas turbine is allowed to accelerate at the maximum allowable value of either of the two shafts. Further provision is made for a blowoff valve control whereby excess energy from a regenerator is diverted from the turbines so that the speed and load control will remain in command, thus preventing overspeed conditions and/or subsequent shutdown.

6 Claims, 3 Drawing Figures

INVENTORS:
ARNE LOFT,
DANIEL JOHNSON,

BY *Bryan C. Ogden*
THEIR ATTORNEY.

INVENTORS:
ARNE LOFT,
DANIEL JOHNSON,
BY Bryan C. Ogden
THEIR ATTORNEY.

TWO-SHAFT GAS TURBINE CONTROL SYSTEM

BACKGROUND OF THE INVENTION

This invention relates generally to a gas turbine control system and more particularly to one for application on a two-shaft gas turbine having an adjustable second stage nozzle.

In the heavy duty gas turbine field where the gas turbine prime mover is used to drive generators, pumping stations, compressor units, chemical processes, marine drives, and locomotives, it has become critical to have precise control of several operating parameters. As the control systems for such gas turbines have advanced in complexity and sophistication so have the operating characteristics of the gas turbine. The considerations in control design for gas turbine power plants are to allow the machine to start in the shortest possible time commensurate with long life, operate at its optimum full load, part load as well as off ambient point, respond rapidly and accurately to commands, and give maximum starting and running reliability. Such controls normally incorporate means to influence the rate of fuel flow to the gas turbine's combustion chambers in accordance with several of the operating parameters such as temperature, speed, load, and time derivatives of these quantities. In a two-shaft machine having a variable area second stage nozzle, a control must be provided to position the nozzle in accordance with its operating parameters which may also be speed and temperature, among others.

As gas turbine control systems have been improved, the tendency has been to move into solid-state electronic controls with their attendant fast response time, precise control and accuracy, increased automation features, and improved reliability. The present invention contemplates such a solid-state electronic control system, although it is to be noted that an analogous mechanical system could also incorporate the substance of the present invention without deviating therefrom.

For safety reasons, it is desirable to have as many protective or backup controls as economically feasible without impairing reliability. It would, therefore, be desirable to have separate controls or control channels for the various operating parameters and at any one time during operating, one particular control would be operative to limit the particular parameter while the other controls, responsive to the different parameters, would function as backup controls.

An example of such a control system for a single shaft gas turbine is known in the art and may be seen in U.S. Pat. No. 3,520,133 issued July 14, 1970 to A. Loft and D. Johnson and which is assigned to the assignee of the present invention. This patent is incorporated herein by reference.

In the above-mentioned patent, there are several individually operative control channels each responsive to a separate operating parameter. A fuel control device is responsive to that output signal from a low-value gate which represents the control channel signal calling for the least amount of fuel, thereby maintaining the most desirable level of fuel consumption for the operating parameters.

In a two-shaft gas turbine, that is, one which has a mechanically independent load turbine set and shaft, the variable area second stage nozzle is the primary means for controlling the speed of the high-pressure turbine and compressor. An example of an electrohydraulic control system for a two-shaft gas turbine may be seen by referring to U.S. Pat. No. 2,625,789 issued Jan. 20, 1953 to N. E. Starkey and assigned to the assignee of the present invention. This patent is also incorporated herein by reference. By referring to column 1, line 34 et seq. of the Starkey patent a listing of operating advantages for a two-shaft gas turbine may be seen. Briefly, Starkey describes a control system whereby the exhaust temperature of the gas turbine serves to vary the nozzle setting to control the speed of the compressor high-pressure turbine shaft, while the speed or load of the load turbine shaft is measured and used to control the fuel flow.

The total energy level in a two-shaft gas turbine is determined by fuel flow similar to the aforementioned single shaft machine, while the energy split between the high-pressure turbine and load turbine is determined by the pressure ratio across their respective stages. It should also be noted that since the speed of the compressor shaft is independent of the load turbine shaft speed, it can be operated at the speed which is most efficient in relation to the temperature parameters. For example, if the exhaust temperature is too low, the compressor speed is allowed to decrease, thereby letting less air flow through the machine which raises the temperature to the desired point, thus improving performance.

In prior art two-shaft turbine control systems, there were two basic requirements that were contradictory. One requirement was for maximum steady-stage performance or efficiency which requires operation at maximum temperature. The other requirement was maximum transient performance or quick load and speed pickup capability which requires a fast addition of fuel to the combustion chambers. Steady-state performance is determined by the material characteristics of the load turbine buckets among other things. At part load the turbine characteristics are such that the firing temperature will be less than the allowable firing temperature limit even though the load turbine is operating at its temperature limit as determined by exhaust temperature. It has been found that by applying a biasing signal to the fuel temperature control channel and allowing the temperature to increase up to the firing temperature limit excellent load pickup characteristics are obtained. After the additional load or speed is added, the control system automatically returns to the maximum steady-state point which, as mentioned, provides the maximum efficiency.

In a two-shaft machine it is advantageous to have acceleration limiting means whereby neither the load turbine shaft nor the high-pressure turbine compressor shaft is allowed to accelerate faster than a desired set point. Since the flow path for the motive fluid passes through both sets of turbine stages, one or the other must control acceleration. By gating the acceleration error signals, the maximum overall machine acceleration is allowed.

For two-shaft machines that incorporate a regenerator, it is necessary to regulate this source of energy input in order to remain on load turbine speed control at all values of fuel flow. Often, when the regenerator is hot and fuel flow is low, particularly around the minimum fuel control signal, there will not be sufficient fuel control range to maintain the turbine on speed control. When in this range of operation, it has been found that by controlling the nozzle position and then opening a blowoff valve, the turbine will remain on speed control by venting off the excess source of energy input. The controlling signal to the nozzle and blowoff valve represents the extent that the actual load turbine speed exceeds its set point.

Accordingly, from the foregoing, one object of the present invention is to provide a control system for a two-shaft gas turbine that allows maximum steady-state performance with improved load and speed pickup capabilities.

Another object is to allow the overall gas turbine to accelerate at the maximum allowable rate of either the compressor high-pressure turbine set or the load turbine.

Still another object is to provide a control means for venting excess hot compressed air such that the control system will continue on speed control.

SUMMARY OF THE INVENTION

Briefly stated, the invention is practiced by adding a speed sensitive biasing signal to the exhaust temperature control means in order to provide a transient exhaust and firing temperature limit. On a sudden increase in load the temperature control will not operate to limit the fuel flow until the increased transient temperature limit is reached, thereby allowing the machine to add fuel and accept load rapidly.

In another embodiment a dual acceleration control is provided whereby the gas turbine acceleration is limited by the higher of two values as seen by the low value gate. A blowoff control may also be provided to relieve the gas turbine of excess energy when it is desired to maintain controllability on the speed and load control.

DESCRIPTION OF THE PREFERRED EMBODIMENT

Figure 1:
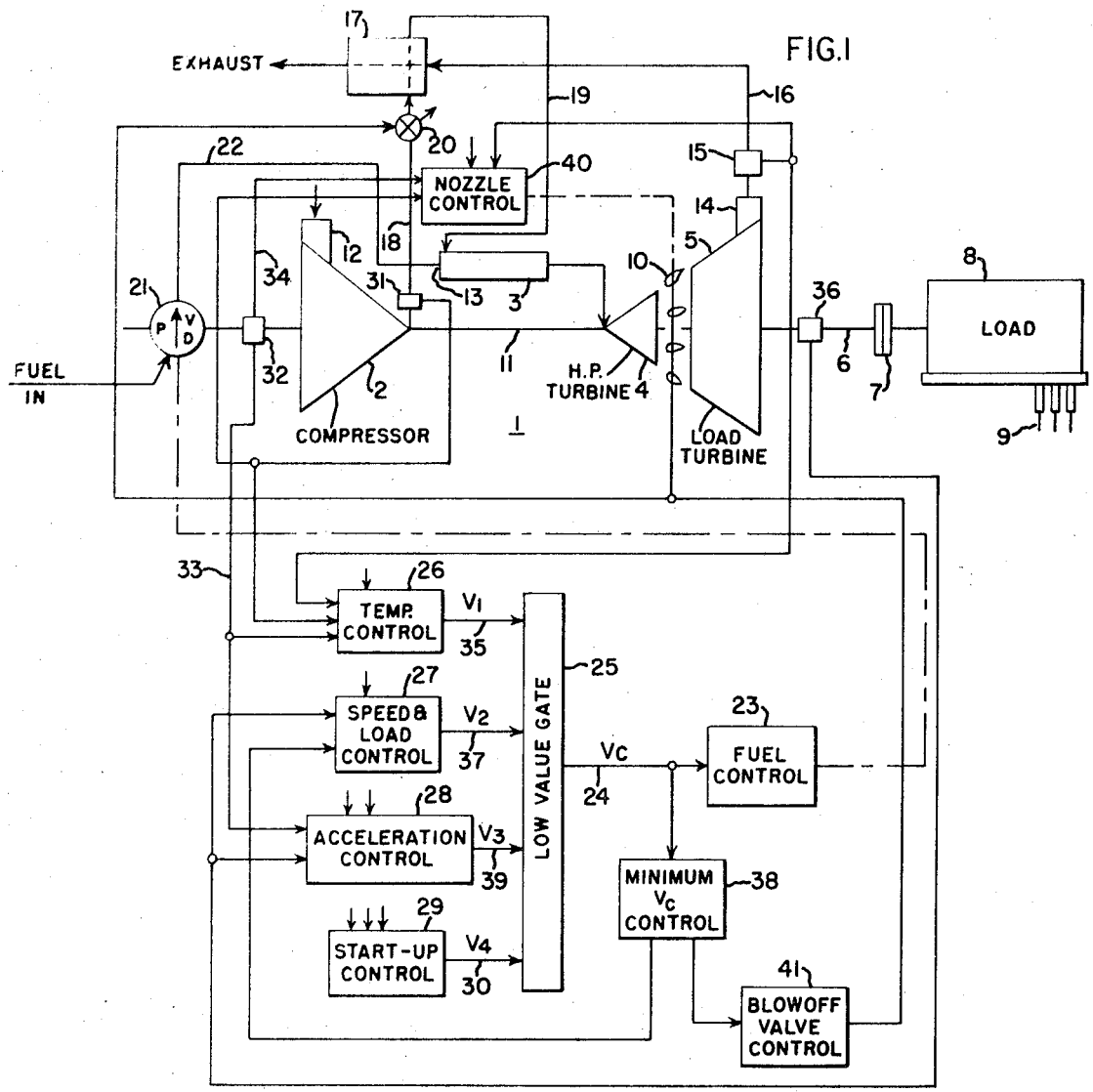
FIG. 1 is a simplified diagram of a regenerative two-shaft gas turbine and its control system for carrying out the objects of the invention.

Referring to FIG. 1 of the drawing, a simplified representation of a two-shaft gas turbine, indicated generally as 1, includes a compressor 2, combustion chamber 3, high-pressure turbine 4, and load turbine or low-pressure turbine 5. It is known in the art that for certain gas turbine applications, it is desirable to have both a high-pressure turbine which drives the compressor, and a load turbine which is mounted on a separate shaft, indicated as 6, to drive the load. In the application as shown in FIG. 1, the load turbine shaft 6 is connected through a set of reduction gears, shown symbolically at 7, to a generator 8. Electrical power leaves the generator 8 through outlet lines 9.

A variable area second stage nozzle 10 aerodynamically couples the high-pressure turbine 4 with load turbine 5. Variable area nozzles are also well known in the art and an example of one, with its attending control system, may be seen in the aforementioned U.S. Pat. No. 2,625,789, incorporated herein by reference. A further example of a variable area nozzle construction may be seen in U.S. Pat. 2,919,890 issued to A. N. Smith et al. on Jan. 5, 1960 and assigned to the present assignee. The details of the second stage nozzle 10 are not material to the present invention and suffice it to say that its main function is to vary the division of energy between the two turbine stages. Also, by varying the area of second stage nozzle 10. the speed of the compressor high-pressure turbine shaft 11 is increased or decreased as desired, while the speed of the load turbine shaft 6 is varied independently by the addition or reduction of fuel.

Air entering the compressor inlet at 12 supports the combustion of fuel injected by a nozzle at 13 in the combustion chamber 3. The heated exhaust gases, after passing through the high-pressure turbine 4 and load turbine 5, exit from the turbine outlet 14 past distributed temperature sensors, indicated symbolically at 15, which provide an average exhaust temperature ($T_x$) for control purposes. The exhaust gases then continue through exhaust line 16 to the regenerator 17 where the exhaust gases serve to preheat the compressor discharge air before combustion. It will be noted in FIG. 1 that the compressor discharge air is directed to the regenerator through discharge line 18. After the air has been preheated, that is energy added, it is directed through line 19 to the combustion chamber 3. Positioned in discharge line 18 is blowoff valve 20 which serves to divert part or all of the compressor discharge air from the regenerator 17. The valve 20 may be any convenient three-way valve having servo means responsive to an appropriate control signal as will be more fully described in a subsequent portion of the description.

A variable delivery fuel pump 21 is mounted on the compressor high-pressure turbine shaft 11 and delivers fuel through fuel line 22 to nozzle 13 at a rate of flow which depends both upon the rotational speed of shaft 11 and the pump stroke which is set by a fuel control servo 23. The details of fuel control servo 23 are not material to the present invention since it may include any servomechanism which positions the stroke-setting control on the pump at a position corresponding to an electrical positioning signal, there being many commercially obtainable devices for such use. Also, since the gas turbine may utilize gaseous fuel, in which case a gas valve position would control fuel flow to the combustion chamber 3, the term "fuel control signal" is used to designate the signal regardless of the type of fuel used.

The fuel control signal $V_c$ is single valued electrical signal which appears on line 24 and is applied to the fuel control 23 by a low-value gate 25. The function of the low-value gate 25 is explained in the aforementioned Loft et al. patent but may be briefly summarized as follows. Low-value gate 25 passes the control signal $V_1$, $V_2$, $V_3$, or $V_4$ whichever is the lowest, thereby requiring the least amount of fuel flow. That signal which appears on line 24 is then the overall controlling fuel signal $V_c$. Each control signal applied to the low-value gate 25 is derived from a separate control channel as shown in FIG. 1, each intended to be controlling over a certain phase of the gas turbine operation.

The Loft et al. patent also discloses an additional portion of the subject matter of the present invention. In particular, the details of the fuel temperature control means 26, the speed and load control means 27, the acceleration control means 28, and the open loop startup means 29 were disclosed for a single shaft gas turbine. In FIG. 1 these control means are depicted schematically in order not to obscure the invention. The subject matter of the present invention represents an improved control system for a two-shaft gas turbine.

Briefly, each control means senses an operating condition of the gas turbine and compares it to a desired reference. The open loop startup control 29 produces a programmed fuel control signal $V_4$ on line 30 in accordance with normal startup events occurring in the gas turbine, such as a certain speed, detection of flame in the combustion chamber and the like. It should be understood that all of the control means are not required for the present invention although each is being briefly described.

The fuel temperature control means 26 has several inputs, one of which is the average exhaust temperature derived from the temperature sensors at 15. A signal representing the compressor discharge pressure is derived from a transducer 31 and also serves as an input to the fuel temperature control means 26. Yet another input signal is one which is dependent upon the compressor high-pressure turbine shaft speed. This signal is part of the present invention and will be fully described when referring to FIG. 2. Suffice it to say here that it is partially derived through an inductor alternator 32 which is mounted on the compressor shaft to indicate actual compressor speed on lines 33 and 34. A reference temperature signal is also an input to the control means 26. The output appears on line 35 as $V_1$ and is indicative of a fuel control signal based on gas turbine temperature.

The speed and load control means 27 has as inputs thereto an actual load turbine shaft speed signal which is derived from a magnetic pickup 36 mounted on the load turbine shaft 6. The actual speed signal is compared with a speed reference and the error signal, if any, appears as the output on line 37. The output $V_2$ is also a fuel control signal and will pass through the low-value gate 25 if it is the lowest of $V_1$, $V_2$, $V_3$, or $V_4$. Another input to the speed and load control means 27 is a minimum fuel flow signal which is derived from the minimum $V_c$ control 38.

The acceleration control means 28 produces a fuel control signal $V_3$ on line 39 which is designed to limit overall gas turbine acceleration during startup or on loss of load. The actual speed signals of both the high-pressure turbine and load turbine are differentiated with respect to time to yield actual acceleration for inputs to the acceleration control means 28. These actual acceleration signals are then compared with a reference so that if the actual acceleration exceeds or is lower than desired acceleration, then the smaller error signal will operate to control the fuel flow. This control means forms part of the present invention and will be more fully described when referring to FIG. 2.

As previously mentioned, each fuel control signal $V_1$, $V_2$, $V_3$, and $V_4$ is applied to the low-value gate 25. The fuel control signal indicative of the lowest fuel flow to the combustion chamber 3 will appear as $V_c$ on line 24. It should be noted that although only one fuel control signal is operative with respect to fuel control 23, each of the other fuel control signals operate as backup protection. Should the proper controlling signal become inoperative, then that fuel control signal resulting in the next lowest fuel flow will pass through low-value gate 25. It should also be noted that the dot-dash line between the fuel control 23 and the fuel pump 21 represents the signal which changes the fuel pump stroke, thereby changing the fuel flow rate through fuel line 22 to the combustion chamber 3.

The nozzle control means 40 is integrated with the fuel control system. It is the fuel flow to the combustion chamber 3 that determines the total energy while the nozzle control 40 divides the energy between the load turbine 5 and the compressor high-pressure turbine set. The nozzle control is responsive to several inputs. The inductor alternator 32 provides an actual compressor high-pressure turbine speed signal via line 34 to the control means 40. The set point for the nozzle control means is comprised of a base temperature signal, an actual exhaust temperature signal derived in temperature sensor 15, and a compressor discharge pressure signal derived from transducer 31.

Figure 3:
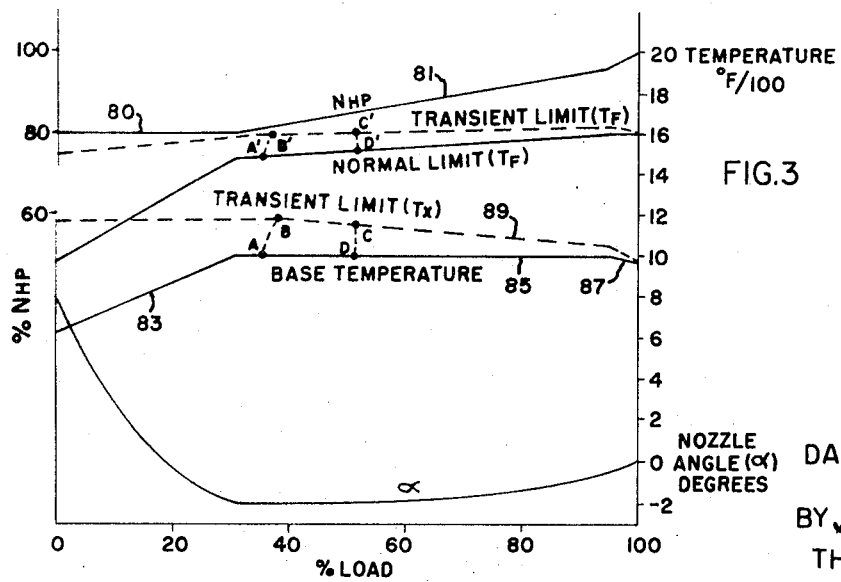
FIG. 3 is a graph showing the response of various functions and parameters over the load range of the gas turbine.

The nozzle control means 40 functions similarly to the nozzle control shown in the aforementioned. Starkey patent, although the present nozzle control is comprised of solid-state electronic components. The output signal appearing on the nozzle dot-dash line controls the angle of the second stage nozzle 10. By opening the nozzle more energy is transferred to the compressor high-pressure turbine set which tends to increase the speed. By speeding up the compressor high-pressure turbine shaft, more air flows through the turbine which tends to reduce the exhaust temperature. A more detailed explanation of the nozzle control means will be given when referring to FIGS. 2 and 3.

Also shown in FIG. 1 is the blowoff valve control means 41 which generates a signal to control the nozzle position and the blowoff valve 20. The input to the blowoff valve means is derived from the minimum $V_c$ control 38.

Figure 2:
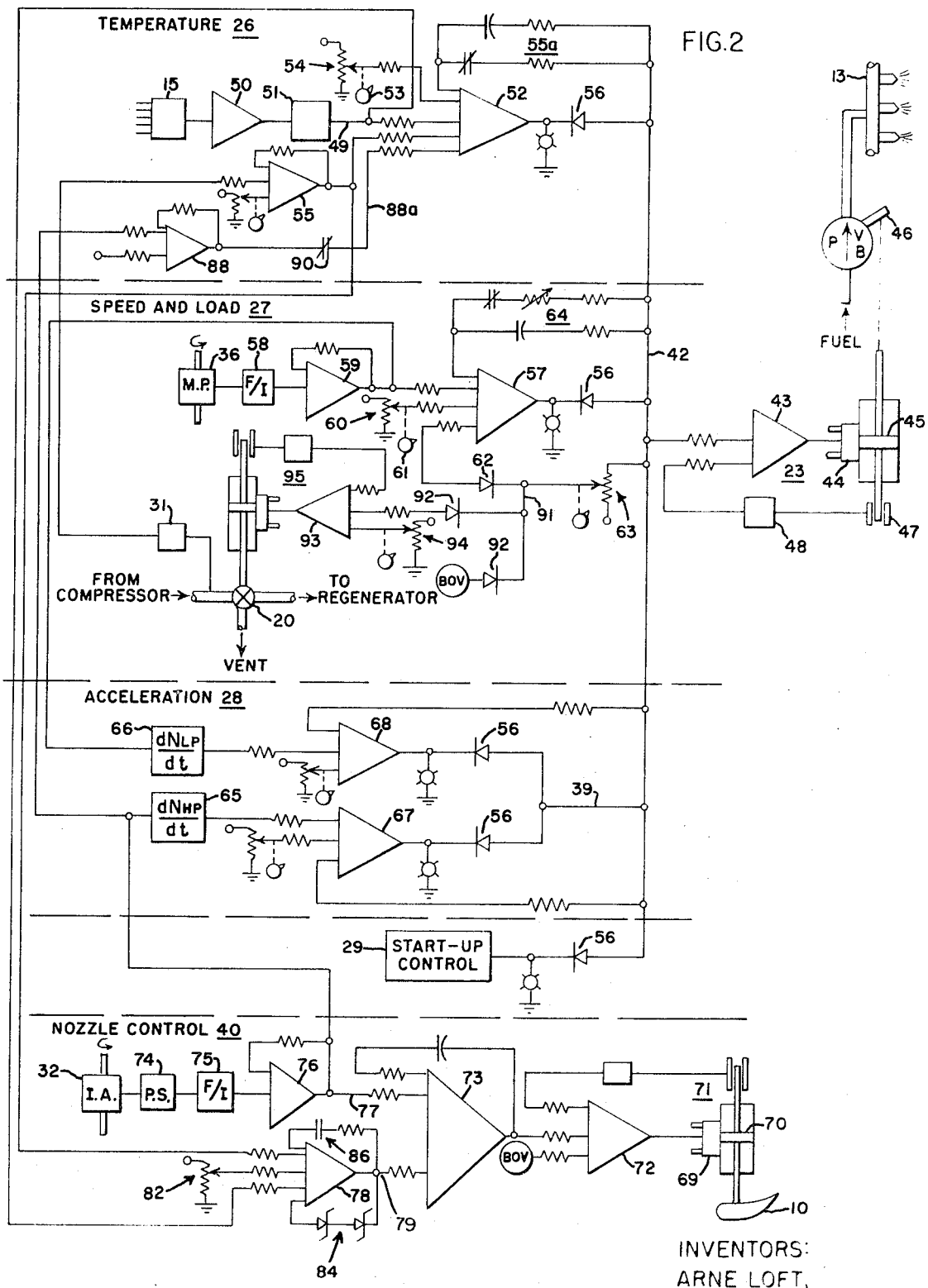
FIG. 2 is a simplified schematic diagram showing in greater detail the DC analog control system of the present invention.

Referring now to FIG. 2, the various fuel control means 26, 27, 28, and 29 are all connected to a common lead 42 which serves as a bus for the low-value gate to supply a single-valued function $V_c$ to the fuel control 23. Fuel control 23 is shown simply as an operational amplifier 43 having its output connected to control a hydraulic servo valve 44 supplying fluid to position a piston 45. The piston 45 sets the stroke of the variable delivery pump 21, symbolically indicated by connection to a handle 46. Also, the actual position of piston 45 is sensed by an LVDT (linear variable differential transformer) 47, whose signal is demodulated at 48 to provide a feedback proportional to position of the piston. Therefore, the fuel control 23, in its simplest form shown, causes the fuel pump 21 to deliver fuel at a rate related to the DC voltage $V_c$ on the common bus 42 (assuming constant pump speed). A gas turbine operating on natural gas would substitute a gas valve for pump 21.

The temperature control means 26 is comprised basically of the same elements as described in the Loft et al. patent. A modified actual exhaust temperature appears on line 49 which is produced by the temperature sensor 15, an operational amplifier 50, and a function generator 51. This signal is the variable input to operational amplifier 52 which is the main amplifier in the temperature control means 26. The setpoint for amplifier 52 is adjustable with a knob 53 controlling an adjustable voltage divider 54. This serves as the base temperature reference, that is, the design steady-state exhaust temperature setting. Another input to amplifier 52, not shown in the Loft et al. patent, is one that is indicative of compressor discharge pressure. A gain and offset is provided for at amplifier 55 as will be apparent to those skilled in the art. This compressor discharge bias is utilized to override the base temperature at high-load levels in order to compensate for ambient temperature conditions. A feedback circuit 55a operates in the usual manner and may be proportional or integral in nature depending on the desired mode of operation. The other input to amplifier 52 relates to the load pickup feature and will be described separately. The output of amplifier 52 is directed to the low-value gate 25 comprising a plurality of diodes 56 poled as shown in FIG. 2 and operative as previously mentioned.

The speed and load control 27 is also similar to Loft et al. and consists of an operational amplifier 57, into which if fed the input indicative of actual load turbine speed derived from the magnetic pickup 36, frequency to current converter 58, and amplifier 59, and the reference speed or desired load signal set on adjustable voltage source 60 through knob 61. Another input to amplifier 56 is the minimum $V_c$ signal. This is shown schematically as diode 62 connected to a voltage divider 63. If the voltage on bus 42 drops to a value selectable by voltage divider 63, diode 62 will cease to be back biased and current will flow from the summing junction of amplifier 57 to maintain the common bus voltage at a minimum value, thereby ensuring a fuel flow sufficient to prevent loss of flame in the combustion chamber. As will be described shortly, a portion of the minimum fuel signal operates the blowoff valve control 41. A feedback circuit 64 is provided for amplifier 57 and functions like that shown in Loft et al. providing for integral or proportional action.

Referring now to the acceleration control means 28, the two speed signals $N_{LP}$ and $N_{HP}$ are differentiated with respect to time to give acceleration signals. This can be done by any suitable method known to the art in devices 65 for high-pressure turbine speed and 66 for load turbine speed. Each separate acceleration signal is compared to a reference (for example, 1 percent per second speed increase) in amplifiers 67 and 68. The low-value gate diodes 56 will pass a single fuel control signal which appears on line 39 and represents the maximum desired acceleration for the two shafts. This is apparent because the amplifier, 67 or 68, that produces the smallest error signal, which represents the shaft closest to the desired acceleration, will be in control of overall gas turbine acceleration.

The startup control 29 operates exactly as shown in the Loft et al. patent and will not be described further.

The nozzle control 40 ultimately controls the angle of the second stage nozzle 10 through a servo valve 69 and piston 70. The actual nozzle position is sensed in a feedback circuit 71 as is well known in the art. Operational amplifier 72 serves to sum a called for nozzle position, derived through amplifier 73, with the actual nozzle position.

Amplifier 73 has two main inputs. One is the actual compressor high-pressure turbine speed signal derived through the inductor alternator 32, a power supply 74, a frequency to current converter 75, and a buffer amplifier 76. The actual speed signal then appears on line 77 at which point it is also directed to the differentiator 65 (for the acceleration control 28) and to the input of main fuel temperature control amplifier 52. The other input to amplifier 73 is derived from operational amplifier 78 which produces a signal on line 79 which can be dependent on several things as will now be explained by referring to both FIGS. 2 and 3.

The signal appearing on line 79 represents the set point for the compressor high-pressure turbine speed, and will cause the nozzle to move in such a manner as to hold $N_{HP}$ (speed of compressor high-pressure turbine) constant over a certain load range, (portion 80 of the $N_{HP}$-curve). Over the upper portion of the load range the nozzle will open, increasing the $N_{HP}$ in order to hold the exhaust temperature constant, portion 81 of the $N_{HP}$-curve. After the gas turbine has been brought up to a full speed no load condition, the $N_{HP}$ is at 80 percent while the exhaust temperature ($T_x$) is not at its maximum steady-state value (base temperature) for the most efficient operation. As load is added (fuel increased) in the speed and load control means 27 the actual $T_x$ will tend to approach the base temperature, which has been set on voltage source 82, which is in fact the same base temperature that is set on voltage divider 54 in the fuel temperature control means 26. However, in this region, before the $T_x$ reaches base temperature, portion 83 on the $T_x$ curve, the diode circuit 84 operates to clamp the output on line 79 at a constant value corresponding to an 80 percent called for speed. Consequently in this load region the nozzle positioning signal, the output of amplifier 73, will move the nozzle toward a closed position to hold the $N_{HP}$ constant while actual $T_r$ increases to the base temperature. It is of course understood that fuel is being added in order to accept the called for load. When the actual $T_r$ reaches base temperature, portion 85 of the $T_r$ curve, then the diode circuit is satisfied and the amplifier 78 is operative with its integrating feedback 86. The signal appearing on line 79 will now be changing as the addition of load and therefore fuel tends to increase $T_r$. The changing set point to amplifier 73 then calls for the $N_{HP}$ to increase so as to bring the error signal on line 79 back to zero. As mentioned, by increasing $N_{HP}$ the $T_r$ will be reduced. In this manner the nozzle is positioned so as to hold $T_r$ constant while $N_{HP}$ increases as seen on portions 85 and 81 respectively of the graph. When the full load is reached, then the diode circuit 84 becomes operative to hold the $N_{HP}$ speed set point at 100 percent. If the speed and load control 27 calls for more fuel at this point, there results a slight increase in exhaust temperature, which will cause a decrease in the fuel control signal $V_1$ from the fuel temperature control means 26 below the other fuel control signals $V_2$, $V_3$, and $V_4$, thus putting it in control to limit fuel flow. Thus the speed and load control 27 can no longer be in control since the fuel is being limited by the temperature control 26 and the high-pressure turbine speed is at its maximum operating point as is the load turbine.

The stated figures are not to be taken as critical values, it being understood that certain adjustments could be made by those skilled in the art without deviating from the scope of the invention. The other input to amplifier 78 is the compressor discharge pressure signal after it has been modified by the gain and offset of amplifier 55 in the temperature control means 26. This bias serves the same purpose in the nozzle control means as it does in temperature control 26, that is it adjusts the base temperature to compensate for ambient conditions. This may be seen on portion 87 of the $T_r$ curve and portion 87a of the firing temperature curve.

LOAD PICKUP FEATURE

At part load, for example, 35 percent at point A on the $T_r$ curve, the exhaust temperature (base temperature) is at its maximum steady-state value for the best gas turbine efficiency. At this part load the firing temperature, ($T_f$) will be less than the firing temperature limit as seen on the $T_f$ curve in FIG. 3. It is necessary to add fuel fast in order to increase load quickly by accelerating the compressor to the proper speed required to carry the new load at the maximum steady-state exhaust temperature. This is done by adding a biasing speed signal to the fuel temperature control amplifier 52. An actual compressor high-pressure turbine speed signal is combined with a 100 percent speed reference in amplifier 88 to produce the biasing signal on line 88a. The proper sign convention is maintained so that this biasing signal adds to the base temperature signal set on voltage source 54. The resulting transient limit $T_r$ curve 89 is indicated in dashed lines on FIG. 3. A logic switch is symbolically indicated at 90 and is operative to eliminate the biasing signal below a minimum speed to prevent a large offset during startup.

The load pickup feature will better be understood by an immediate description of its operation. Assuming that it is desired to increase load from 35 percent to say 50 percent, the operator will call for such an increase on the speed and load control 27. This will add fuel and since the transient $T_r$ is now operative through the amplifier 88, the exhaust temperature will be allowed to quickly increase to point B on the transient $T_r$ curve. The added fuel allows an immediate increase in load and in addition causes the nozzle 10 to move in such a way as to increase the $N_{HP}$ in an attempt to reduce transient $T_r$. As the $N_{HP}$ increases, the additional airflow will allow a further increase in fuel in order to hold the transient $T_r$ (from point B to point C on the transient $T_r$ curve). The nozzle will continue to move increasing the $N_{HP}$ and reducing the transient $T_r$ until the steady-state $T_r$ (and desired load) is again reached (point D on the $T_r$ curve, 50 percent load). It will be apparent that this is possible because the transient biasing signal is not added to the nozzle control means 40. In this manner the dynamic response of the two-shaft gas turbine is considerably enhanced.

BLOWOFF VALVE CONTROL

When the regenerator 17 is utilized, cutting back the fuel flow to the minimum may not be enough to maintain the gas turbine on speed and load control 27. There is a minimum amount of fuel required to prevent flameout and this minimum is established by the previously mentioned minimum $V_c$ control 38. When this minimum value is in control, it is often necessary to open the nozzle 10 and/or the blowoff valve 20 in order to divert energy from the gas turbine. In either case energy is dissipated or dissolved so that the gas turbine will continue to be governed by the speed and load control 27 without overspeed or shutdown. In FIG. 2 there is an output from the voltage divider 63 appearing on line 91 which is used to set how far the nozzle and/or blowoff valve is opened. Usually the nozzle is opened first as determined by the diodes 92. The value of this signal represents the extent that the load turbine speed exceeds its set point as will be apparent to one skilled in the art.

When the minimum $V_c$ control 38 is operative and the nozzle opening signal is activated, it is fed directly to amplifier 72 as indicated by the circle containing BOV. After the nozzle is fully open, letting a portion of the unwanted regenerator energy be absorbed by the inertia of the compressor high-pressure turbine set, the operative signal on line 91 then starts to open the blowoff valve 20. This is done through an operational amplifier 93 with a set point produced by voltage divider 94. A common servo valve and piston assembly 95 opens the valve in response to the output of amplifier 93. The blowoff valve, when operative, releases the hot compressor discharge air into the air or elsewhere such that it is not directed through the gas turbine.

The operation has been explained in conjunction with the description of the various control means. One further fact relates to the position of the nozzle as the gas turbine is started and brought to its full speed no load condition. During this phase of operation the nozzle is generally in the full open position and as fuel is added to bring the load turbine up to speed, the high-pressure turbine also inherently comes up to its minimum operating speed, which by way of example was set at 80 percent.

It will be appreciated that a control system for a two-shaft gas turbine has been described which has an increased dynamic response to a sudden increase in called for load or speed. Also, acceleration limiting means have been provided which allows the overall gas turbine to accelerate at the most efficient rate. Further, a control means is provided which diverts the energy of a regenerator away from the turbine so that it may continue to be governed by the speed and load control means.

What is claimed is:

1. In a control system for a gas turbine power plant having a compressor high-pressure turbine unit and a load turbine unit, the compressor high-pressure turbine unit discharging motive fluid through an adjustable nozzle to the load turbine unit, said units being mechanically independent and also having servo means to control fuel flow to the combustion chambers in accordance with a fuel control signal, the combination comprising:

a plurality of closed loop control means, each arranged to supply a respective fuel control signal for controlling a respective operating condition, at least one of said control means being continuously responsive to a temperature condition of the gas turbine and comparing said condition to a temperature setting, gating means connected to be responsive to said loop control means and enabling only one of said fuel control signals representing the least fuel to control said fuel flow servo means, nozzle control means responsive to shaft speed and temperature signals such that the adjustable nozzle is normally positioned to hold the exhaust temperature substantially constant over a portion of the load range, and biasing means connected to augment the temperature setting of the closed loop control means responsive to temperature so that when additional load is called for, fuel can be added quickly allowing temperature to increase to the new temperature limit.

2. The control system according to claim 1 in which the biasing means is comprised of means to compare an actual compressor high-pressure turbine speed with a substantially 100 percent speed reference and apply the resulting signal to the loop control means responsive to temperature.

3. The control system according to claim 2 further comprising circuit opening means for eliminating the biasing means from circuit below a minimum shaft speed.

4. The control system according to claim 1 in which at least one of the closed loop control means is responsive to load turbine speed and includes means to divert excess energy from the turbine, with the energy-diverting means being responsive to a signal that represents the difference between actual load turbine speed and its desired speed.

5. The control system according to claim 4 in which the energy-diverting means includes the adjustable nozzle and further having valve means connected so as to vent compressor air before it enters the combustion chamber, said energy-diverting means arranged and adapted to open first the adjustable nozzle and then the valve means.

6. The control system according to claim 1 in which at least two of said closed loop control means are responsive to acceleration of said units and including first means to compare the compressor high-pressure unit acceleration with a first acceleration with a second acceleration reference and providing respective acceleration limiting fuel control signals to said gating means.

* * * * *